United States Patent [19]
Griffin

[11] Patent Number: 5,212,219
[45] Date of Patent: * May 18, 1993

[54] DEGRADABLE PLASTICS
[75] Inventor: Gerald J. L. Griffin, Leics, England
[73] Assignee: Epron Industries Limited, England
[*] Notice: The portion of the term of this patent subsequent to Jan. 8, 2008 has been disclaimed.
[21] Appl. No.: 754,626
[22] Filed: Sep. 4, 1991

Related U.S. Application Data
[63] Continuation-in-part of Ser. No. 565,998, Aug. 10, 1990, abandoned, which is a continuation of Ser. No. 182,949, Apr. 18, 1988, Pat. No. 4,983,651.

[30] Foreign Application Priority Data
May 21, 1987 [GB] United Kingdom ............... 8712009
[51] Int. Cl.$^5$ .............. C08L 3/00; C08F 8/00; C08G 63/48; C08G 63/91
[52] U.S. Cl. .................... 524/17; 524/35; 524/47; 524/56; 525/55; 525/191; 525/232; 525/236; 525/237; 525/240; 525/241
[58] Field of Search ........ 524/17, 35, 47, 56; 525/55, 191, 232, 236, 237, 240, 241

[56] References Cited
U.S. PATENT DOCUMENTS
4,983,651 1/1991 Griffin .................... 524/47

Primary Examiner—Nathan M. Nutter
Attorney, Agent, or Firm—Laff, Whitesel, Conte & Saret

[57] ABSTRACT

A degradable polymer composition is disclosed which comprises a blend of a normally stable chemically saturated polymer, such as polyethylene, a less stable chemically unsaturated polymer or copolymer, such as a styrene/butadiene block copolymer, or natural rubber, an antioxidant active over a limited period and a latent pro-oxidant, such as an organic salt of a transition metal, e.g. cobalt naphthenate. The presence together of the anti-oxidant and the pro-oxidant give rise to a period of induction before a sharp loss of physical strength occurs, whereby the period of induction can be exploited as the effective working life of the polymer composition. The polymer composition preferably also includes filler particles of a directly biologically sensitive material such as natural starch, a derivative of natural starch, a natural protein or a natural cellulose product or a powdered sugar of melting point higher than the processing temperature of the host polymer composition, whereby, the biological breakdown, in natural environments or in the especially biologically active surroundings of composting urban garbage, of the molecular fragments created by the onset of oxidative scission of the molecular chains of the chemically saturated polymer is accelerated by the presence of said filler particles.

67 Claims, 9 Drawing Sheets

DEGRADABLE PLASTICS

This is a continuation-in-part of U.S. patent Application Ser. No. 07/565,998, filed Aug. 10, 1990, and now abandoned, which in turn was a continuation of U.S. patent Application Ser. No. 07/182,949, filed Apr. 18, 1988, now U.S. Pat. No. 4,983,651.

FIELD OF THE INVENTION

This invention relates to degradable synthetic polymer compositions.

BACKGROUND OF THE INVENTION

Many packaging items such as bags and containers are destined, after a relatively short functional life, to arrive as a significant component of urban garbage or, to a much lesser extent, in the form of litter. Increasingly, such packaging items are being manufactured from plastics, that is to say from synthetic polymer compositions, which, while being cheap and having the physical properties which make them highly suitable for such packaging purposes, have the disadvantage, as components of waste or garbage, of being highly resistant to destruction by the chemical and physical actions to which they are subject in the natural environment and thereby such components constitute a mounting nuisance.

It is generally accepted that over 50% of the annual tonnage of all manufactured synthetic polymers are applied as packaging materials and that some 90% of this flow finishes as a component of urban garbage.

It has already been proposed that synthetic polymer compositions intended for packaging and the like purposes should be capable of being broken down chemically and physically by environmental action to which items made from such compositions became subject as litter. For example, it has been proposed that such compositions should be capable of being broken down biologically, i.e. should be "biodegradable".

It has hitherto been acceptable to use the term "biodegradable" to describe polymer materials which might be environmentally acceptable when used as "one-trip" packaging materials but it is now clear that the chemical and physical processes at work in the interaction between the environment and these materials are more complex than was originally believed. Biodegradability can be defined as the degradation at the molecular level of substances by the action of enzymes themselves derived from the metabolic processes of micro-organisms. Such very specific interactions have long been familiar in the case of natural polymers, for example that between cellulose and wood-decaying fungi, can be cited. In the field of synthetic polymers one can also find examples such as the destruction of certain polyester type polyurethanes by fungi, in particular Ulocladium chartarum.

Restricting consideration to that group of synthetic polymer types which are in general use in the packaging industry we find that these polymers are unaffected by enzymes derived from micro-organisms. A careful examination of circumstances in which such polymers appear occasionally to have been degraded by biological action has disclosed a high probability in each case that the process of degradation has proceeded in at least two stages, the first being chemical and resulting in a reduction of the molecular weight of some part of the polymer to a point at which the second, biological, stage can commence as an interaction between the micro-organisms of the environment and the low molecular weight material that has appeared. It is also recognized that the first, chemical, stage of this degradation process can follow different mechanisms which can be broadly classified under two headings, the first being photochemical oxidative chain scission, and the second chemical catalytic oxidative chain scission.

SUMMARY OF THE INVENTION

Accepting that it is an increasingly important factor in preserving the quality and stability of the human environment that the packaging industry should be provided with materials of controlled degradability, it is an object of the present invention to provide a synthetic polymer capable of undergoing degradation under the conditions to which items made therefrom are subject when they form a component of garbage disposed of by the landfill or composting route of garbage disposal.

Clearly in the case of buried materials it is not possible to rely upon photochemical processes to form any part of a degradation process. Accordingly, and accepting the need imposed by the economics of the situation to restrict the range of polymers to those synthetics already in use in the packaging industry, it is proposed, in accordance with the preferred embodiments of the present invention, to combine familiar packaging polymers with catalytic systems which will initiate the chemical oxidation stage at a point in time roughly coincident with the disposal of the packages as waste. Desirably, subsequent oxidative and biological interactions should then proceed in such a manner that after a period of 6 to 12 months the materials would, as a result of their advanced degradation, be impossible to retrieve from a typical landfill mass without fragmentation. Small fragments of polymeric materials are accepted as innocuous components of the soil in respect of the absence of any associated phytotoxic effects or interference with the quality of drainage water. There would also be no mechanical interference with agricultural or civil engineering activities by such small residual fragments.

According to one aspect of the invention, there is provided a degradable polymer composition which incorporates a normally stable chemically saturated polymer, a less stable chemically unsaturated compound in the form of a polymer or copolymer, and an antioxidant active over a limited period, whereby, on depletion of the anti-oxidant, and in the presence of a pro-oxidant a sharp loss of physical strength will occur as a result of oxidative action.

According to another aspect of the invention there is provided a degradable polymer composition which comprises a blend of a normally stable chemically saturated polymer, a less stable chemically unsaturated compound in the form of a polymer or copolymer, an antioxidant active over a limited period and a latent pro-oxidant, the presence together of the anti-oxidant and the pro-oxidant giving rise to a period of induction before a sharp loss of physical strength occurs, whereby the period of induction can be exploited as the effective working life of the polymer composition.

The stable polymer is preferably a polyethylene such as low-density polyethylene, linear low-density polyethylene or high density polyethylene. Alternatively, the stable polymer may be polypropylene or polystyrene. The associated unsaturated compound may be an elastomer of the type made by the polymerization of 1:4 dienes, or the copolymerization of such 1:4 dienes with ethenoid comonomers.

Preferred compositions embodying the invention form a class of polymer formulations, the lifetime of which is divided into two zones. This is achieved by exploiting the phenomenon of the induction period which can be noted when an oxidation sensitive material is protected by selected types of protective chemical additives generally called antioxidants. Such additives are a normal ingredient of most packaging polymer formulations, being required initially to protect the polymer during the extreme thermal stresses of compounding and conversion processing. The invention has found that by selecting types and concentrations of anti-oxidants and pro-oxidants in compositions in accordance with the invention, systems can be produced which, while being adequately stable for the duration of the essentially anaerobic conversion processing in enclosed machinery such as extruders, will subsequently reach the point at which the anti-oxidant is expended and the system enters into its second time zone during which oxidation takes place. This oxidation ideally commences after a passage of time which, at normal room temperature, safely exceeds the normal functional life of such products.

It will be appreciated that upon the introduction of plastic products into buried or composted urban garbage the conditions change dramatically as compared with the normal, "on shelf" conditions prior to disposal. In the upper layers of burial sites where the conditions are aerobic, and in the windows or cylinders of aerobic composting systems, peak temperatures in the region of 70° C. are reached in two or three days, and usually then decline only slowly reaching, perhaps, 55° after two months. Reports from various studies are remarkably consistent on this thermal behavior and the information to be found in "Handbook of environmental control, Vol. II, Solid waste" edited by R.G. Bond and C.P. Straub and published by the CRC Press of Ohio is typical. At the beginning of the second time zone polymer formulations, embodying the present invention, with their anti-oxidant content mostly consumed by the protection demands of the processing operation, are thus exposed, when forming part of garbage thus disposed of by burying or composting, to temperatures some 50° C. higher than in their normal service condition. The temperature jump will be even higher for material which has been used for food packaging and will have been under refrigeration for part of its functional life. Because the oxidative step is entirely chemical in nature, the process will continue at the elevated temperature with a greatly increased velocity, for chemical processes generally double their rate for each 10° C. elevation in temperature. Numerous experimental trials conducted in laboratory ovens or in a miniature composting unit have confirmed these expectations. In order to achieve a sufficiently rapid rate of chemical chain breaking with the attendant loss of physical properties it has been found desirable to include in the compositions embodying the invention substances capable of auto-oxidation because such substances are more readily initiated into the oxidation process by virtue of their unsaturation and, once initiated, the chemical processes can involve the more resistant saturated molecular structures of the common packaging thermoplastics such as the polyolefines.

It is preferred to use, as the unsaturated polymeric component of a composition embodying the invention, natural rubber i.e. brown or pale crepe Hevea rubber or gutta percha or particular styrene butadiene elastomers i.e. Stereon which not only provide adequate levels of autoxidizable unsaturation but also greatly improve some of the physical properties of the products especially their impact strength.

The unsaturated polymer can also be polyisoprene; polybutadiene, terpolymer of ethylene, propylene and 1,6-hexadiene or norbornene; a terpolymer of styrene, butadiene and isoprene; copolymer of butadiene and styrene, isoprene, acrylic acid or acrylonitrile; or a copolymer of isobutylene and isoprene.

The saturated polymer is preferably polyethylene, i.e. low density polyethylene and/or linear low density polyethylene; or polypropylene.

The saturated polymer can also be a copolymer of ethylene and vinyl acetate, acrylic acid or propylene; a copolymer of styrene and ethylene or acrylic acid; and a copolymer of styrene and butadiene, isoprene or acrylic acid.

Transition metal salts are preferred as pro-oxidants for these degradable compositions and it has been found that, provided that the anti-oxidant and pro-oxidant types and ratios are correctly selected and adhered to, then transition metal compounds capable of the oxygen transfer chemistry can be incorporated into polymer compositions jointly with anti-oxidant ingredients in the compounding operation.

The transition metal salts used in preferred embodiments are salts formed by combining transition metals such as cobalt, manganese, ferric and copper with organic acids of sufficiently high molecular weight to give salts soluble in the host polymer blends used.

The term "transition metal" used herein means an element having greater than 8 and less than 18 electrons in the outer group of the ion. Transition metals are thus usually capable of electron transitions between their outer shells and the variable valency states resulting render them capable of inducing oxidation reactions. In practice, those transition elements which are highly toxic, radioactive, are extremely rare and costly are not normally encountered in industrial use as oxidation catalysts. Typical transition metals whose salts and complexes do feature in such applications and could be considered for use in carrying out the present invention are Ce, Zn, Cu, Ag, Ni, Co, Fe, Mn, Cr, and V. They would be used as such with organic portion of their salts as display an adequate level of solubility in polymer melts, typically the organic portion is stearates, palmitates, octoates, oleates, behenates, myristates, erucates, linolates, naphthenates, acetonylacetates, 8-hydroxyquinolinates, metalammine salt complexes.

In compositions embodying the invention the transition metal salts may be used in quantities such as to provide from 0.001% to 2% by weight of the metal in the composition, depending upon the desired oxidation rate.

In embodiments of the invention, the anti-oxidant used is generally that incorporated as a matter of course in the manufacture of the respective chemically saturated polymer. Thus, commercially supplied polyolefine materials are normally sold containing a variety of well established anti-oxidants and any of these antioxidants can be used in the compositions of this invention. Typical of such anti-oxidants is the ICI product Topanol (4-methyl-1, 6-di(2-hydroxy-3-tertbutyl-5-methylbenzyl)phenol used for stabilizing most low-density polyethylene (LDPE) materials.

Other anti-oxidants which may be found in commercially supplied polyolefines are butylated hydroxytabiene, butylated hydroxyanisole, tertiary-butylhydroquinone, Irganox 1010 and Irganox 1076.

The proportion of the unsaturated polymer or copolymer in a composition embodying the invention may be in the range 2.0% to 50% by weight of the composition, preferably between 2% and 15% in order to balance the factors of cost, adequate oxidation effect, and adequate restoration of strength loss due to the presence of starch where used. In embodiments where starch is incorporated in the composition, the starch content may be from 0.5 to 60% by weight of the composition, although mechanical strength of the composition at the higher end of this range tends to be low. Preferably the starch content is from 3% to 25% by weight of the composition.

As noted above, when items formed from compositions embodying the invention are buried or composted with other garbage, degradation commences early in the second time zone, with oxidation following depletion of the antioxidant. Also commencing early in the second time zone is the interaction between the microorganisms occurring profusely in the garbage environment and the partly oxidized polymers. It has been observed that the inclusion of particulate organic fillers such as starch into synthetic polymer formulations can have an accelerating effect on the biological breakdown of those polymers which are themselves intrinsically sensitive to direct enzyme chain scission. In order, therefore, to accelerate the biological interactions between the scission products arising from the oxidation stage as and when they arise in the second time zone of the behavior of the products here described it is proposed to incorporate appropriate types and quantities of starch following technology that has been extensively described by the inventor - e.g. "Starch Granules - Their Properties and Applications" - New Approaches to Research on Cereal Carbohydrates - R.D. Hill and L. Munck, published by Elsevier, Amsterdam, 1985, - pp. 201-210. Such additions would be omitted in those cases where high clarity was essential in the products.

EXAMPLE 1

Polyethylene containing an antioxidant and having a melt flow index (MFI) of 20 and a 0.924 density (Novacor GF2024) was compounded with 43 weight percent corn starch and four percent calcium oxide in a Leistritz 110 mm twin screw extruder. The starch had been dried to less than one percent moisture prior to use. The product was strand pelletized and stored in sealed containers as our starch batch for later use.

One hundred grams of polybutadiene, Firestone Diene-35 rubber, was compounded with 100 grams of polyethylene of 20 MFI and 0.924 density on a Brabender 4 inch laboratory two roll mill. The compounded rubber was sheeted out in 5 millimeter thin slabs, cut into strips and granulated on a Brabender Prep mill. This is our rubber batch.

Polyethylene containing approximately 2.0 percent manganese metal was prepared by hot blending 22.7 percent manganese stearate with polyethylene containing an antioxidant and having 2 MFI and 0.916 density in a Leistritz 110 mm twin screw extruder. The manganese stearate was obtained from Shepard Chemical and said to contain 8.8 percent manganese metal. This product was strand pelletized and stored in sealed containers as our manganese batch prior to use. The manganese content of the product was assayed by Inductive Coupled Plasma and found to contain 1.91 percent manganese metal.

Polyethylene containing approximately 0.75 percent Iron was prepared by combining 16.1 grams of ferric stearate assayed to contain 9.33 percent ferric iron with 183.9 grams of the 2.0 MFI polyethylene of density 0.924 on a two roll laboratory mill. The compounded product was sheeted out and granulated in a laboratory prep mill. This is our iron batch.

Films of 0.0015 to 0.0016 inch thickness were prepared on a Bolco International FD 4780 blown film line with a two inch die and a 1.5 inch screw.

The control film resin was a 60/40 blend (low density polyethylene), of Novapol LF-0219-D (2.0 Melt Index 0.919 density), and (linear low density resin), Novapol PF-0118-D (1.0 Melt Index 0.918 density).

A test film was prepared by blended 14 percent of the starch batch pellets (containing 43 percent starch), 1.04 percent manganese batch pellets (containing 1.91 percent manganese), 1.00 percent iron batch (containing 0.75 percent iron), 4.0 percent rubber batch (containing 50 percent Dien-35), with 79.96 percent of the control film resin blend.

Figure 1:
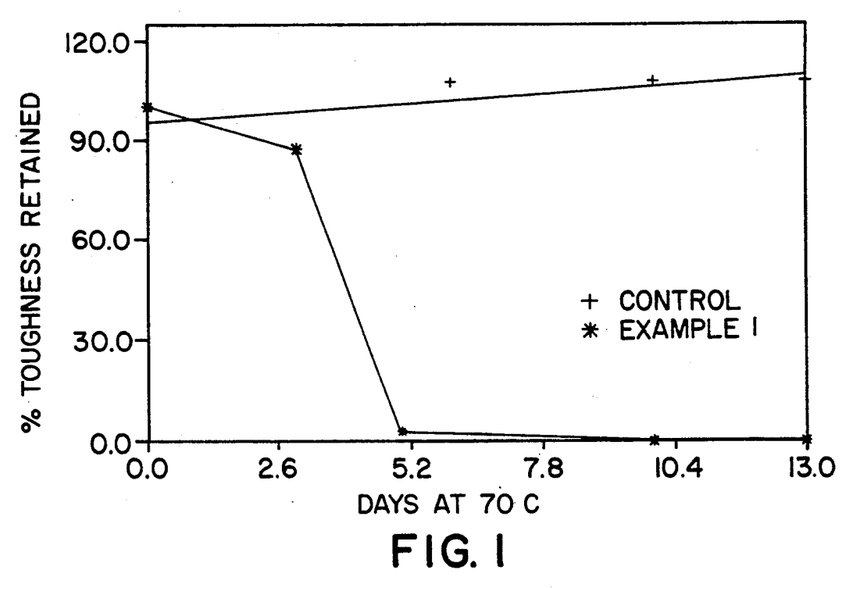
FIG. 1 is a graph illustrating the comparison of a control film with the film of Example 1.

The films were cut into specimens 0.5 inches wide and 6 inches long. These specimens were tested in accordance with ASTM D882-83 on a Model 1011 Instron tensile tester. Tests were performed on the samples before and after aging in a 70° C. forced air oven. The data in FIG. 1 compares the control film's retained toughness to the film containing 6% starch, 2% Diene-35, 150 ppm manganese metal, and 75 ppm ferric metal. The retained toughness is calculated by dividing the toughness value after aging by the toughness value before aging and multiplying by 100. The toughness is the work required to break a sample. Mathematically it is the stress integrated with respect to strain. The aging at elevated temperatures allows acceleration of the auto-oxidation process allowing tests results to be available in a matter of weeks.

EXAMPLE 2

Synthetic polyisoprene was evaluated as an unsaturated polymer. One hundred grams of the polyisoprene, Goodyear Natsyn 2200 rubber, was combined with 100 grams of the polyethylene of 20 MFI and 0.924 density on a Brabender 4 inch laboratory two roll mill. The polyisoprene rubber blend was sheeted out in 5 millimeter thin slabs cuts into strips and granulated on a Brabender Prep mill. 4.0 percent by weight of the polyisoprene granules (containing 50% by weight Natsyn) was blended with 14 percent of the starch batch pellets (containing 43 percent starch), 1.04 percent manganese batch pellets (containing 1.91 percent manganese), 1.00 percent iron batch (containing 0.75 percent iron), and 79.96 percent of the control film resin blend, described in example 1.

The sample films were prepared as in Example 1 and cut into specimens 0.5 inches wide and 6 inches long. These specimens were tested in accordance with ASTM D882-83 on a model 1011 Instron tensile tester.

Figure 2:
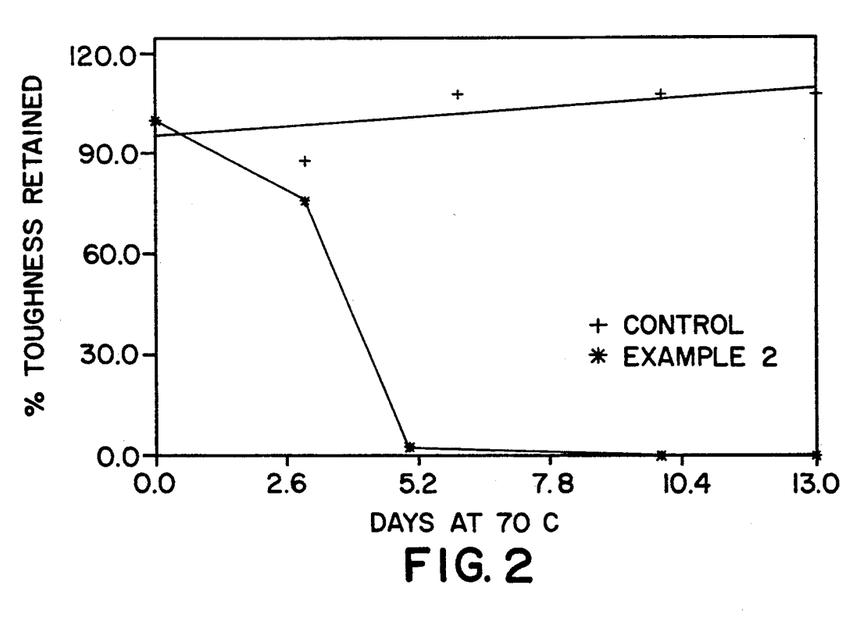
FIGS. 2-14 are graphs illustrating the comparison of a control film and the films of Examples 2-14 respectively.

Tests were performed on the samples before and after aging in a 70° C. forced air oven. The data from these experiments is presented in FIG. 2.

EXAMPLE 3

Natural polyisoprene was evaluated as an unsaturated polymer. One hundred grams of brown crepe natural Hevea rubber was combined with 100 grams of the polyethylene of 20 MFI and 0.924 density on a Brabender 4 inch laboratory two roll mill. The natural rubber blend was sheeted out in 5 millimeter thin slabs cuts into strips. This product could not be granulated in the prep mill due to its tackiness and was cut into 5 millimeter cubes by hand. 4.0 percent of the cubed natural rubber blend (containing 50 percent natural rubber) was blended with 14 percent of the starch batch pellets (containing 43 percent starch), 1.04 percent manganese batch pellets (containing 1.91 percent manganese), 1.00 percent iron batch (containing 0.75 percent iron), and 79.96 percent of the control film resin blend, described in Example 1.

Figure 3:
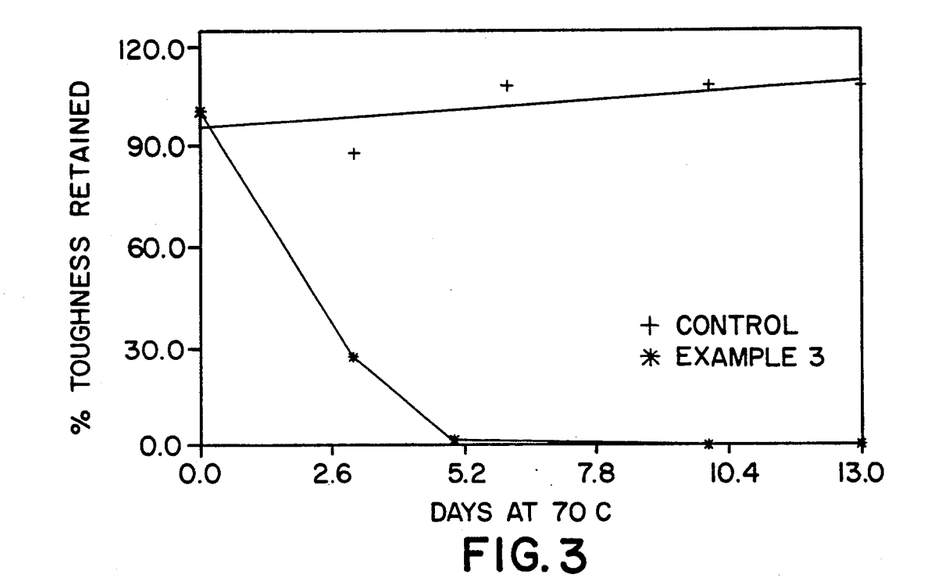

The sample films were prepared as in Example 1 and cut into specimens 0.5 inches wide and 6 inches long. These specimens were tested in accordance with ASTM D882-83 on a model 1011 Instron tensile tester. Tests were performed on the samples before and after aging in a 70° C. forced air oven. The data from these experiments is presented in FIG. 3.

EXAMPLE 4

Synthetic EPDM rubber was evaluated as an unsaturated polymer. 100 grams of EPDM rubber, Dupont Nordel 2722 rubber, was combined with 100 grams of the polyethylene of 20 MFI and 0.924 density on a Brabender 4 inch laboratory two roll mill. The EPDM rubber blend was sheeted out in 5 millimeter thin slabs cuts into strips and granulated on a Brabender Prep mill. 4.0 percent of the granulated rubber blend (containing 50 percent Nordel 2722), was blended with 14 percent of the starch batch pellets (containing 43 percent starch), 1.04 percent manganese batch pellets (containing 1.91 percent manganese), 1.00 percent iron batch (containing 0.75 percent iron), and 79.96 percent of the control film resin blend, described in Example 1.

Figure 4:
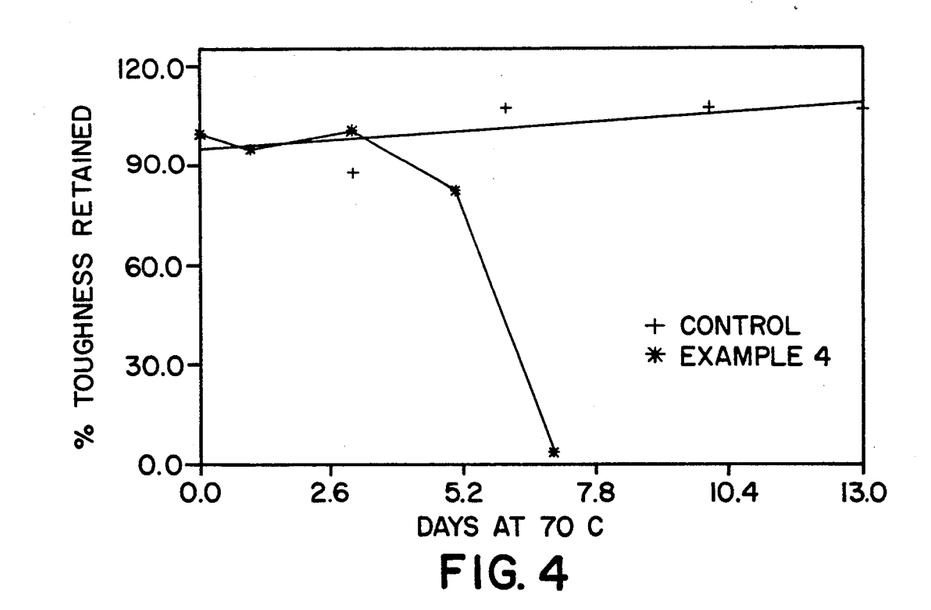

The sample films were prepared as in Example 1 and cut into specimens 0.5 inches wide and 6 inches long. These specimens were tested in accordance with ASTM D882-83 on a Model 1011 Instron tensile tester. Tests were performed on the samples before and after aging in a 70° C. forced air oven. The data from these experiments is presented in FIG. 4.

EXAMPLE 5

Blended pellets containing 50 percent Stereon 841A in Novapol GI-2024A (20 Melt Index, 0.924 density) were prepared using the Liestritz 110 mm twin screw extruder. Stereon 841A is a styrene-butadiene triblock copolymer containing 43 percent styrene units. 4.0 percent of the styrene-butadiene blended pellets were blended with 14 percent of the starch batch pellets (containing 43 percent starch), 1.04 percent manganese batch pellets (containing 1.91 percent manganese), 1.00 percent iron batch (containing 0.75 percent iron), and 79.96 percent of the control film resin blend, described in Example 1.

Figure 5:
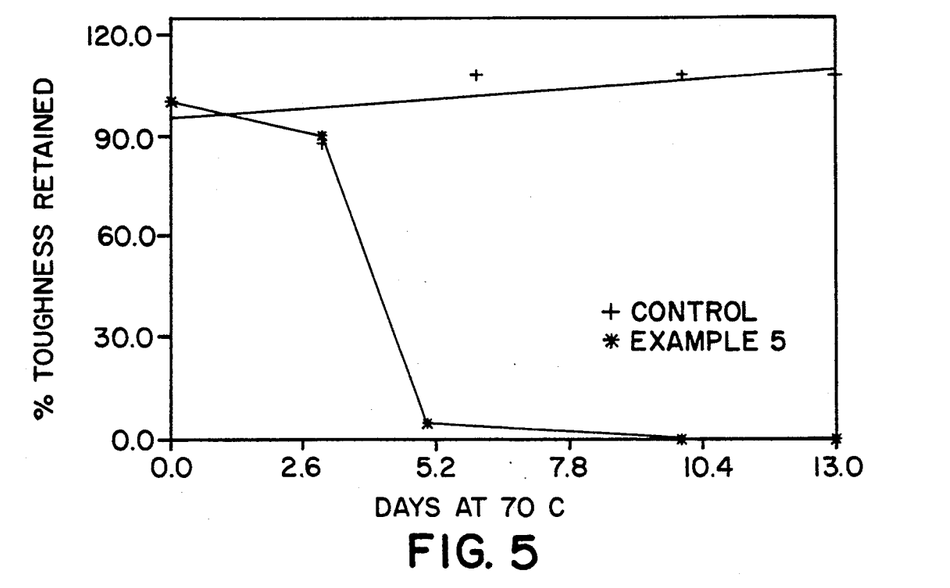

The sample films were prepared as in Example I and cut into specimens 0.5 inches wide and 6 inches long. These specimens were tested in accordance with ASTM D882-83 on a model 1011 Instron tensile tester. Tests were performed on the samples before and after aging in a 70° C. forced air oven. The data from these experiments is presented in FIG. 5.

EXAMPLE 6

A cobalt batch pellet containing 2.58 percent cobalt stearate (containing 9.5 percent cobalt metal) prepared with polyethylene in a Farrel CP23 continuous mixer. The cobalt batch pellet was calculated to contain 0.25 percent cobalt metal. Six percent of cobalt pellets (containing 0.25 percent cobalt) were blended with 14 percent of the starch batch pellets, 4 percent of the styrene-butadiene pellets of Example 5, and 76 percent of the control film resin blend of Example 1.

Figure 6:
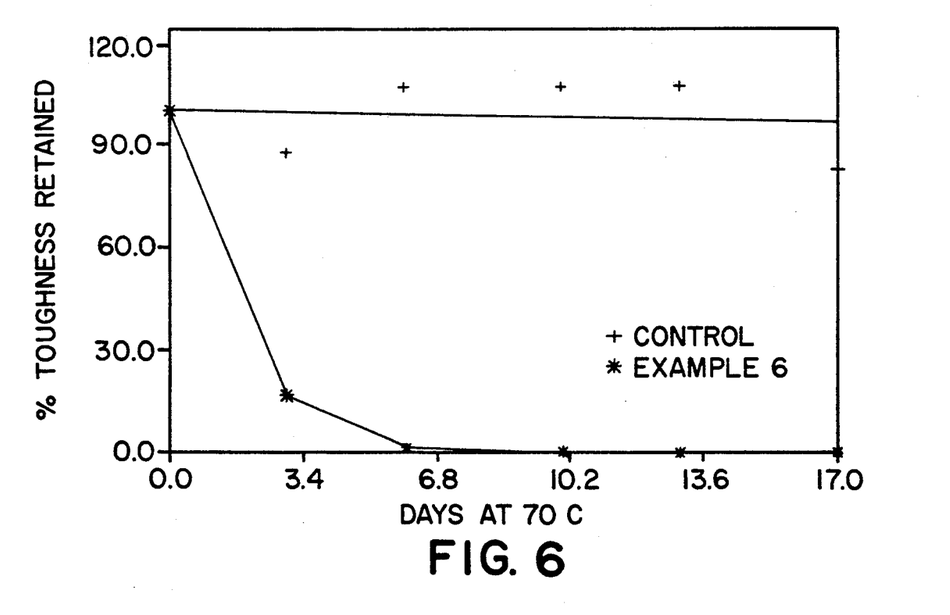

The sample films were prepared as in Example 1 and cut into specimens 0.5 inches wide and 6 inches long. These specimens were tested in accordance with ASTM D882-83 on a Model 1011 Instron tensile tester. Tests were performed on the samples before and after aging in a 70° C. forced air oven. The data from these experiments is presented in FIG. 6.

EXAMPLE 7

A masterbatch containing 16.67 grams copper oleate containing (6 percent copper metal) and 183.33 grams of polyethylene were combined on a Brabender two laboratory mill. The product was sheeted out and granulated in a Brabender prep mill. This copper blend was calculated to contain 0.75 percent copper.

2.0 percent of the copper blend pellets were blended with 14 percent of the starch batch pellets, 4 percent of the styrene-butadiene pellets of Example 5, and 76 percent of the control film resin blend of Example 1.

Figure 7:
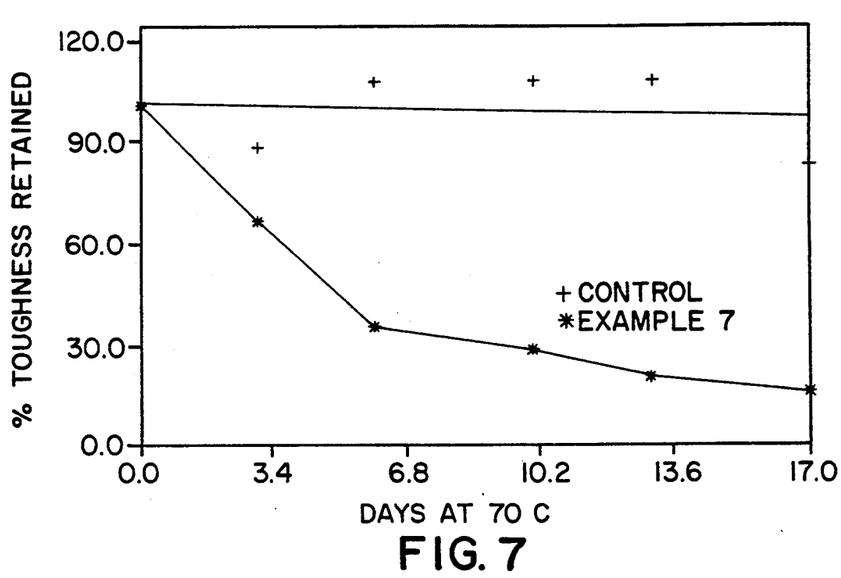

The sample films were prepared as in Example 1 and cut into specimens 0.5 inches wide and 6 inches long. These specimens were tested in accordance with ASTM D882-83 on a model 1011 instron tensile tester. Tests were performed on the samples before and after aging in a 70° C. forced air oven. The data from these experiments is presented in FIG. 7.

EXAMPLE 8

A cerium batch containing 19.05 grams cerium (containing 10.5 percent cerium metal) and 180.95 grams of polyethylene were combined on a Brabender two laboratory mill. The cerium product was sheeted out and granulated in a Brabender prep mill. This cerium batch was calculated to contain 1.0 percent cerium metal. 1.5 percent of the granulated cerium product were blended with 14 percent of the starch batch pellets, 4 percent of the styrenewere butadiene pellets of Example 5, and 76 percent of the control film resin blend of Example 1.

Figure 8:
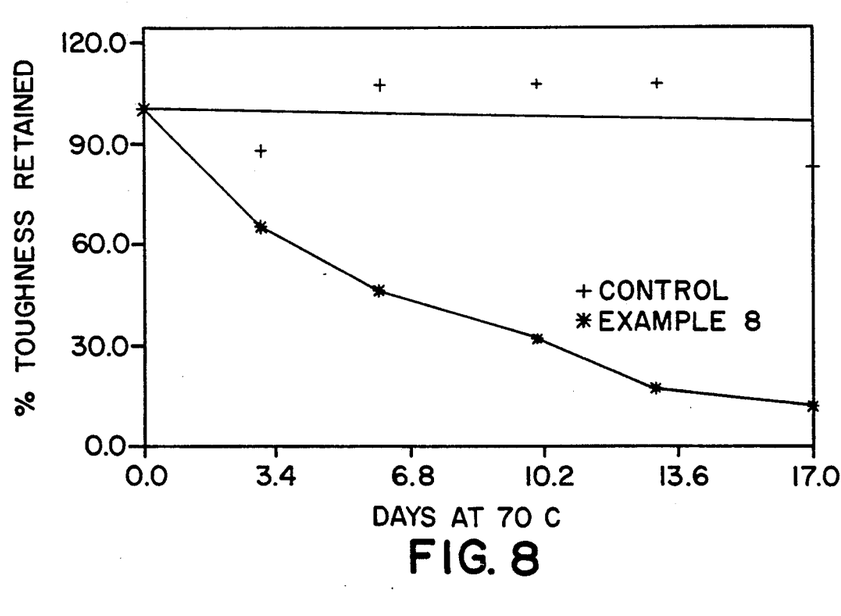

The sample films were prepared as in Example 1 and cut into specimens 0.5 inches wide and 6 inches long. These specimens were tested in accordance with ASTM D882-83 on a Model 1011 Instron tensile tester. Tests were performed on the samples before and after aging in a 70° C. forced air oven. The data from these experiments is presented in FIG. 8.

EXAMPLE 9

A sample of film was prepared according to Example 1 with 14 percent of the starch batch pellets (containing 43 percent starch), 2.0 percent of the iron batch (containing 0.75 percent iron), 4.0 percent of the styrene-butadiene batch (containing 50 percent Stereon 841A), and 80 percent of the control film resin blend described in Example 1.

Figure 9:
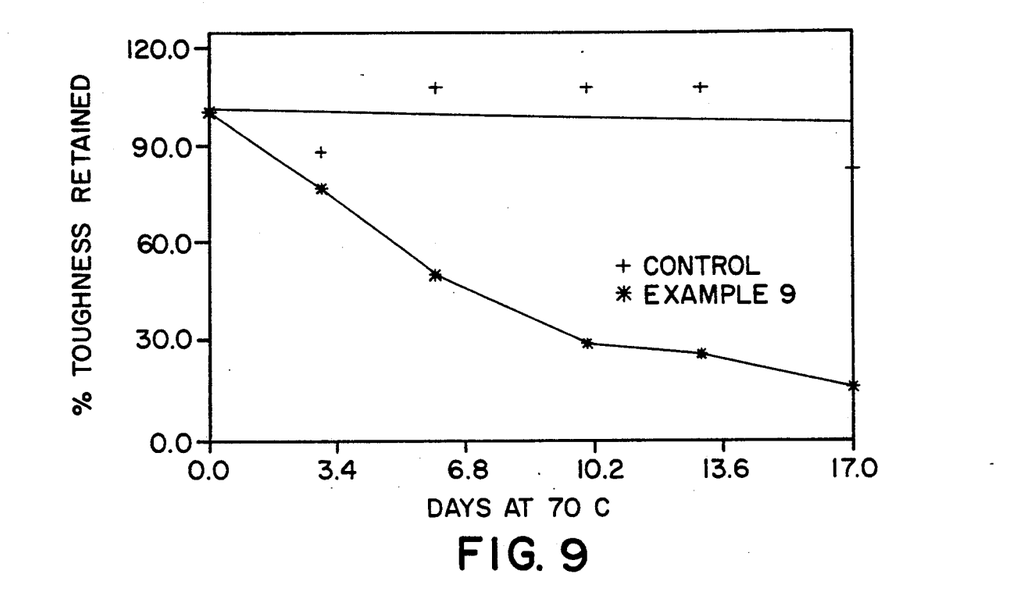

The sample films were cut into specimens 0.5 inches wide and 6 inches long. These specimens were tested in accordance with ASTM D882-83 on a Model 1011 Instron tensile tester. Tests were performed on the samples before and after aging in a 70° C. forced air oven. The data from these experiments is presented in FIG. 9.

EXAMPLE 10

A sample of film was prepared according to Example 1 with 14 percent of the starch batch pellets (containing 43 percent starch), 0.78 percent of the manganese batch pellets (containing 1.91 percent manganese), 4.0 percent of the styrene-butadiene rubber batch (containing 50 percent Stereon 841A), with 80 percent of the control film resin blend described in Example 1.

Figure 10:
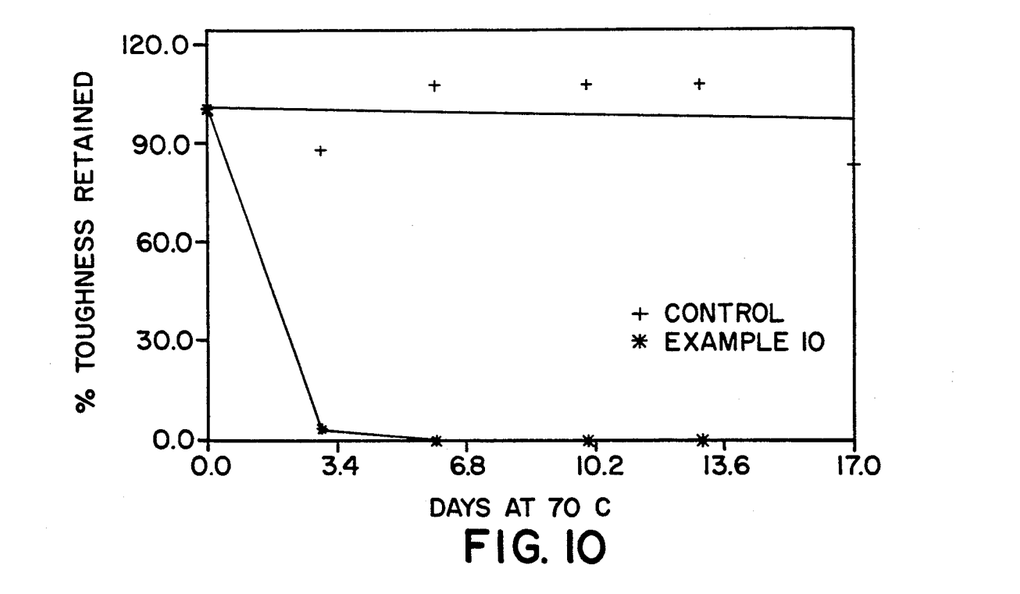

The sample films were cut into specimens 0.5 inches wide and 6 inches long. These specimens were tested in accordance with ASTM D882-83 on a model 1011 Instron tensile tester. Tests were performed on the samples before and after aging in a 70° C. forced air oven. The data from these experiments is presented in FIG. 10.

EXAMPLE 11

72 pounds of low density polyethylene (El Paso 108 Rexene 2.5 Melt Index) and thirty pounds of linear low density polyethylene (USI 6010 2.0 melt Index) were blended to prepare a polyethylene film. This film served as a control. A first test film was prepared which contained the following: 3.9 pounds of rubber/polyethylene blend (50% Stereon 840A / 50% Novacor GF-0218), 1.0 pounds of manganese pro-oxidant (0.5% manganese metal content), 68.6 pounds of low density polyethylene (El Paso 108 Rexene), and 26.5 pounds of linear low density polyethylene (USI 6010).

Figure 11:
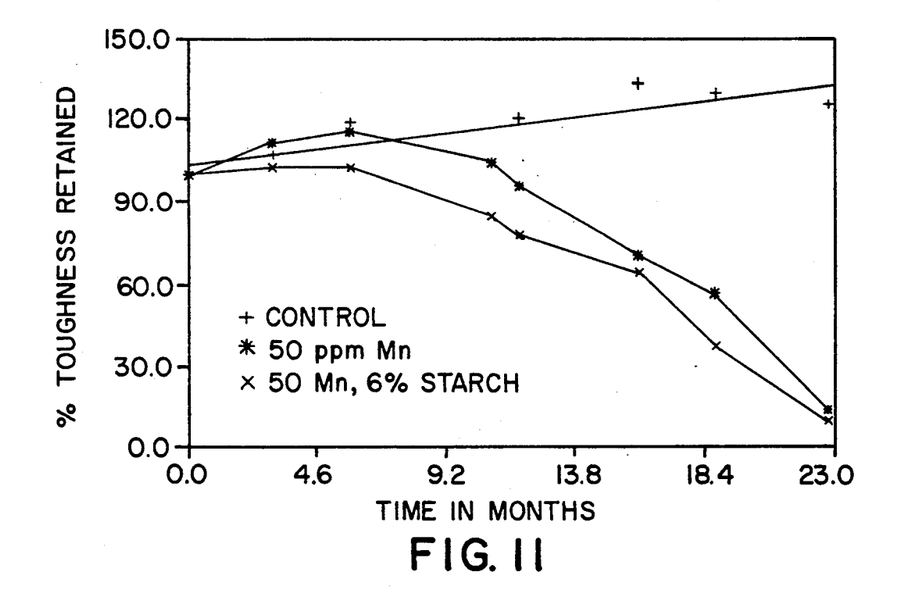

A second test film was made by combining 1.0 pounds of 0.5% manganese metal pellets, 64.7 pounds low density polyethylene, and 20.3 pounds linear low density polyethylene with 14 pounds of a batch containing 38.5% corn starch, 13.9% Stereon 840A, 46.6% linear low density polyethylene, and 1.0% calcium oxide. The degradation of these films have been followed for approximately two years at room temperature. The loss in tensile toughness is shown in FIG. 11 as loss in retained toughness.

EXAMPLE 12

Figure 12:
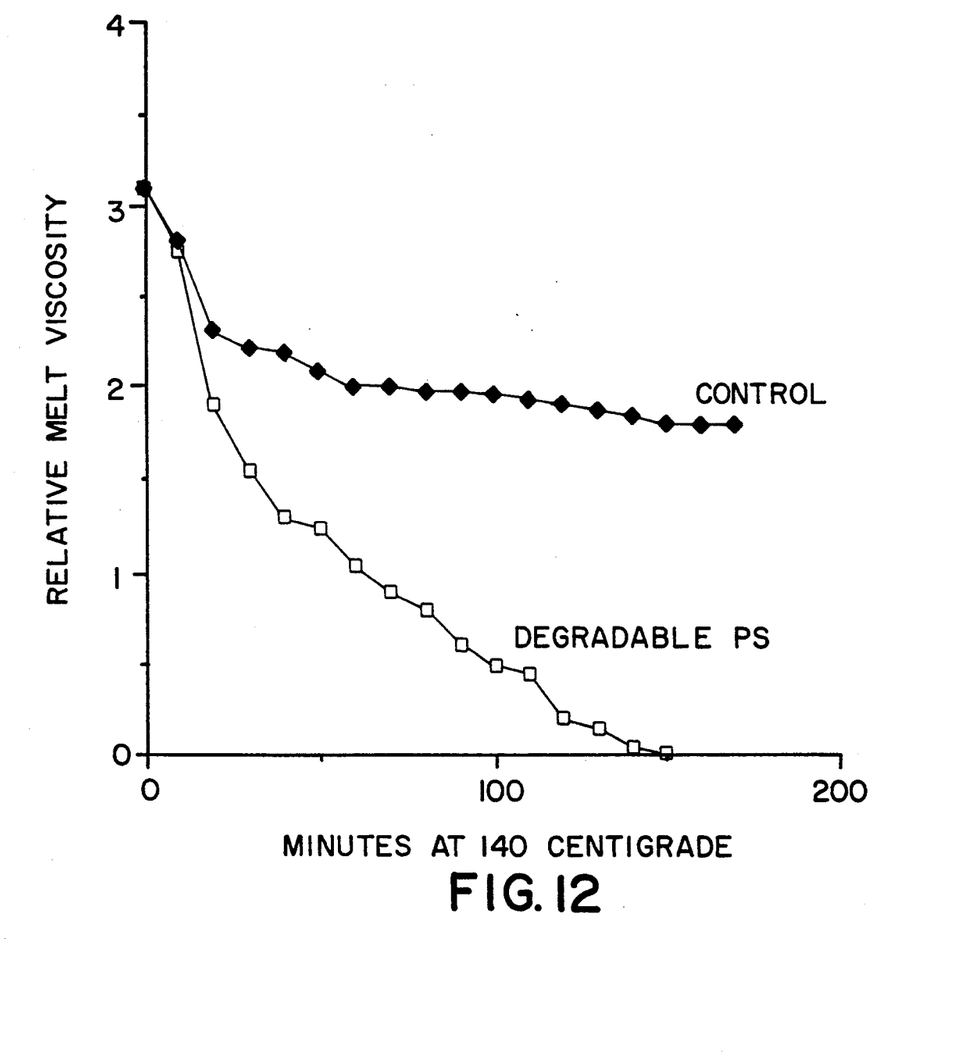

Plastics formulations comprising polystyrene and a diene elastomer were prepared in a Brabender Plastograph, effectively a miniature Banbury mixer of about 30 grams capacity provided with means to display constantly the torque exercised by the rotors. 25 grams of crystal polystyrene was fluxed in the mixer at 140° C. and 5 grams of natural rubber added in the form of chips. The influence of the transition metal catalyst can be readily perceived when 50ppm of manganese was added directly to the mixer chamber in the form of powdered manganese stearate and the effect is shown in FIG. 12 in which the manganese containing mix is compared with the behavior of a control experiment in which the identical blend of crystal polystyrene and rubber is kept at the same temperature in both cases effectively using the mixer rotor system, revolving at 50 rpm, as a melt viscometer.

EXAMPLE 13

Figure 13:
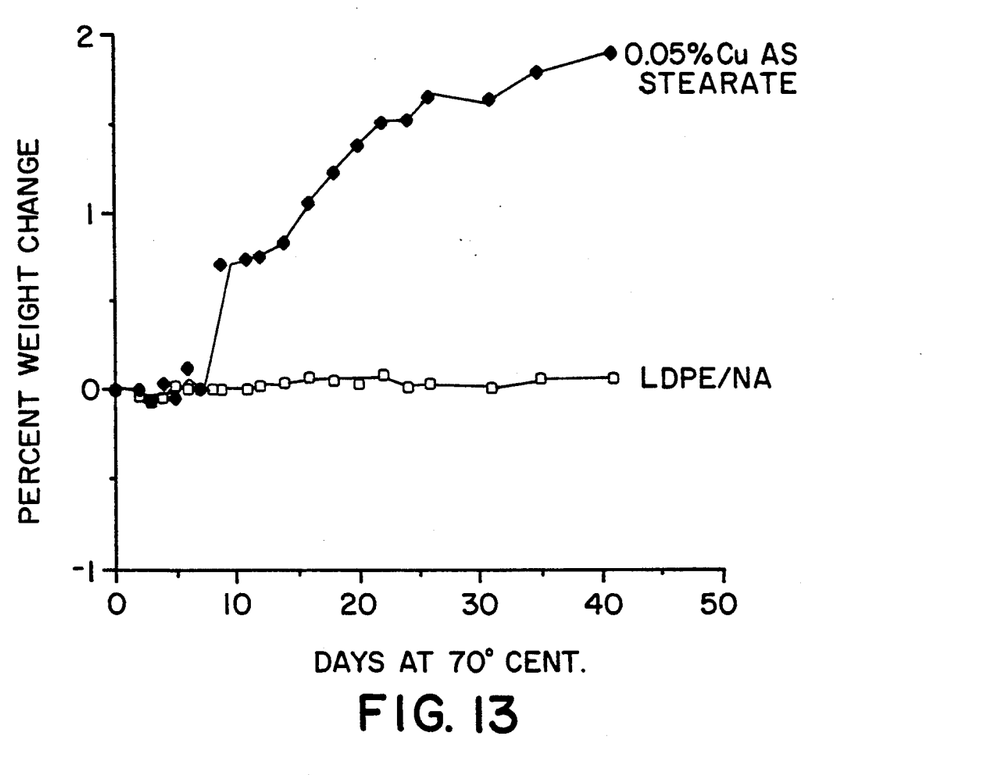

A 50:50 mixture by weight of pale crepe natural rubber and IDPE of MFT 2 and density 0.916 was made by hot blending 200 gram batches of the two ingredients on a laboratory 2-roll mill running at even speeds. The product was cut from the rolls in long strips which were reduced to chips in a rotary granulator and these chips were cold blended with LDPE of MFT 2 and density 0.916 in such ratio as to give a rubber content of 5% in the mixture. This mixture of chips was formed into 50 micron blown film by using a Betol 25mm screw diameter extruder feeding an extrusion blowing die of 50 mm diameter with a blow-up ratio of about 1:2.5. This film was used as a control sample against a further film into which 500 ppm of copper stearate and LDPE of MFT 2 and density 0.916. These sample films were cut into 50mm diameter discs which were weighed to 5 places of decimals and maintained in a thermostatically controlled forced circulation oven at 70° C. and the samples re-weighed each day. After the expiry of the induction period at about 7 days the weight of the sample film containing the copper catalyst increased rapidly due to the uptake of oxygen from the atmosphere whilst the control sample showed virtually no change in weight. After ten days the copper containing samples were so fragile that they could be crumbled between the fingers. The weight changes of the samples can be seen from FIG. 13.

EXAMPLE 14

Figure 14:
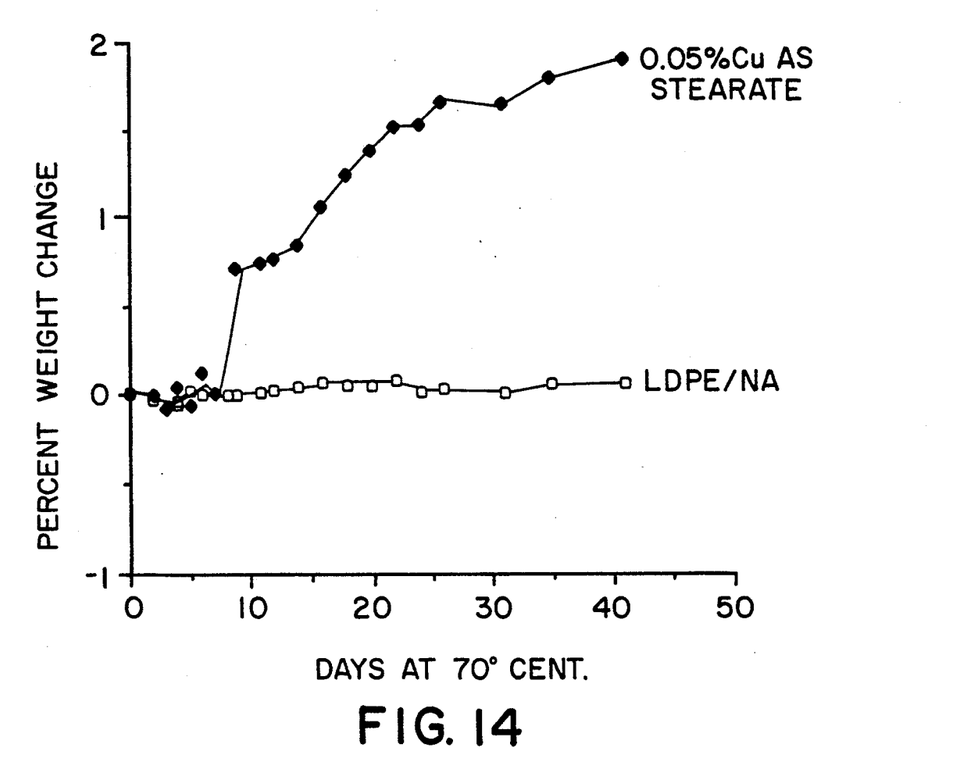

A 50:50 mixture by weight of pale crepe natural rubber and IDPE of MFT 2 and density 0.916 was made by hot blending 200 gram batches of the two ingredients on a laboratory 2-roll mill running at even speeds. The product was cut from the rolls in long strips which were reduced to chips in a rotary granulator and these chips were cold blended with LDPE of MFT 2 and density 0.916 in such ratio as to give a rubber content of 5% in the mixture. This mixture of chips was formed into 50 micron blown film by using a Betol 25mm screw diameter extruder feeding an extrusion blowing die of 50mm diameter with a blow-up ratio of about 1:2.5. This film was used as a control sample against a further film into which 500 ppm of cooper had been introduced at the cold blending stage as a further master batch containing 0.1% cooper made from cooper stearate and LDPE of MFT 2 and discs which were weighed to 5 places of decimals and maintained in a thermostatically controlled forced circulation oven at 70° C. and the samples re-weighed each day. After the expiry of the induction period at about 7 days the weight of the sample film containing the copper catalyst increased rapidly due to the uptake of oxygen from the atmosphere whilst the control sample showed virtually no change in weight. After ten days the copper containing samples were so fragile that they could be crumbled between the fingers. The weight changes of the samples can be seen from FIG. 14.

EXAMPLE 15

A master batch was prepared from 46.2% of polypropylene of MFT 20, 38.5% of maize starch predried to less than 1% water content, 13.3% of Cariflex TR-1102S styrene butadiene rubber, 2% of calcium oxide by processing the cold blended ingredients in a Buss PR46 Ko-Kneader continuous compounding machine whose output was in the form of air cooled pellets.

These pellets were cold blended in the ratio 14:1 with a masterbatch of manganese stearate and linear low density polyethylene containing 7.5% manganese prepared in a Leistritz 110 mm twin screw extruder. 15 parts by weight of this masterbatch were cold blended with 85 parts by weight of polypropylene of MFI 20 and extruded into the form of filaments using a conventional multi-orifice spinneret die attached to an appropriate extruder. The filaments were cold dran to form fibers of approximately 20 microns diameter and these converted into staple fiber tow suitable for spinning into thread for weaving. Samples of this tow were dry incubated at 70° C., after 10 days incubation, had degraded to the stage where the tow could be powdered readily by gently rubbing between the fingers. Control fiber samples not containing the degradant master batch remained unchanged after aging alongside the degradable material under identical conditions.

It is envisaged that for certain applications, the prooxidant, such as a transition metal salt, may be omitted from the polymer composition, and the presence of iron salts in the soil, or in the other garbage with which packaging or the like made from the polymer composition is buried or composted may be relied upon to promote oxidation of the unsaturated polymer or copolymer in the composition blend whereby degradation may be initiated by the act of burying or composting the garbage.

A composition embodying the invention may be made into a degradable product comprising a thin film or sheet adapted for the manufacture of bags and wrappings, the thin film or sheet having been formed by extrusion, extrusion blowing, film casting or calendaring the polymer composition. A composition embodying the invention may alternatively be formed into three-dimensional objects such as containers or vessels, or disposable utility items, by injection molding, blow molding, compression molding, thermoforming or rotational casting of the polymer composition.

I claim:

1. A polymer composition for preparing degradable articles having as essential ingredients a blend of:
   a stable chemically saturated polymer containing an antioxidant active over a limited time,
   a less stable chemically unsaturated polymer or copolymer, and
   a pro-oxidant.

2. A composition as claimed in claim I where the stable chemically saturated polymer is a copolymer of ethylene.

3. A composition as claimed in claim 2 where the stable chemically saturated polymer is a copolymer of ethylene and a compound selected from the group consisting of vinyl acetate, acrylic acid, propylene and mixtures thereof.

4. A composition as claimed in claim 3 where the stable chemically saturated polymer is a copolymer of ethylene and vinyl acetate which has been partially or totally hydrolyzed to leave hydroxy functional groups.

5. A composition as claimed in claim 1 where the stable chemically saturated polymer is a copolymer of propylene.

6. A composition as claimed in claim 5 where the stable chemically saturated polymer is a copolymer of propylene and ethylene or acrylic acid.

7. A composition as claimed in claim 1 where the stable chemically saturated polymer is a copolymer of styrene.

8. A composition as claimed in claim 7 where the stable chemically saturated polymer is a copolymer of styrene and a compound selected from the group consisting of butadiene, isoprene, and acrylic acid.

9. A composition as claimed in claim I where the unstable chemically unsaturated polymer is a synthetic elastomer of the type made by the polymerization of a 1:4 diene.

10. A composition as claimed in claim 9 where the chemically unsaturated polymer is produced by the polymerization of butadiene.

11. A composition as claimed in claim 9 where the chemically unsaturated polymer is produced by the polymerization of isoprene.

12. A composition as claimed in claim 1 where the unstable chemically unsaturated polymer is a copolymer of butadiene and styrene.

13. A composition as claimed in claim I where the unstable chemically unsaturated polymer is a copolymer of butadiene and isoprene.

14. A composition as claimed in claim 1 where the unstable chemically unsaturated polymer is a copolymer of butadiene and acrylic acid or a copolymer of butadiene and acrylonitrile.

15. A composition as claimed in claim 1 where the unstable chemically unsaturated polymer is a copolymer of isobutylene and isoprene.

16. A composition as claimed in claim 1 where the unstable chemically unsaturated polymer is a terpolymer of ethylene, propylene, and one of the compounds selected from the group consisting of 1,6-hexadiene, norbornene.

17. A composition as claimed in claim I where the unstable chemically unsaturated polymer is a terpolymer of styrene, butadiene and isoprene.

18. A composition as claimed in claim 1 where the unstable chemically unsaturated is natural rubber.

19. The composition of claim 18 wherein the natural rubber is Hevea rubber or gutta percha.

20. A composition as claimed in claim I where the antioxidant is of the sacrificial type being an organic compound more readily oxidized than the host polymer blend.

21. The composition of claim 20 where the antioxidant is taken from the group consisting of butylated hydroxytoluene, butylated hydroxyanisole, tertiary-butylhydroquinone, Irganox 1010, Irganox 1076, and 4-methyl-1,6-di(2-hydroxy-3 tertbutyl-5 methyl-benzyl) phenol.

22. A composition as claimed in claim I where the pro-oxidant is at least one transition metal salt.

23. The composition of claim 22 wherein the transition metal salt is selected from the group consisting of Ce, Zn, Cu, Ag, Ni, Co, Fe, Mn, Cr, V; and the organic salt is selected from the group consisting of stearates, palmitates, octoates, oleates, behenates, myristates, erucates, linolates, naphthenates, acetonylacetates, 8-hydroxyquinolinates and metalammine salt complexes.

24. The composition of claim 23 wherein the preferred transition metal salt is Mn, Co, and Fe and the preferred organic salt is selected from the group stearates, naphthenates and octoates.

25. A composition as claimed in claim 1 in which the stable polymer is selected from the group consisting of polyethylene, polymethyl methacrylate, polypropylene, polystyrene, polyurethane, and their copolymers with other monomers; the unsaturated polymer or copolymer is selected from a group consisting of styrene-butadiene copolymer, polybutadiene, # polyisoprene, and a natural rubber; an antioxidant; and the pro-oxidant is a transition metal salt or complex.

26. A composition as claimed in claim I in which the stable polymer is selected from the group consisting of polyethylene, polypropylene, polystyrene, and their copolymers with other monomers; the unsaturated polymer or copolymer is selected from a group consisting of styrene-butadiene copolymer, polybutadiene, polyisoprene, and a natural rubber; and the pro-oxidant is a transition metal salt or complex wherein the transition metal is selected from the group consisting of Ce, Zn, Cu, Ni, Co, Fe, Mn, Cr and V, and its salt displays an adequate level of solubility in polymer melts.

27. The composition of claim 26 comprising a blend of said stable polymer; 2–50% by weight of said unsaturated polymer or copolymer; and 0.00–2.0% of said transition metal, wherein the transition metal is the metal salt of the organic compound selected from the group consisting of stearates, palmitates, octoates, oleates, behenates, myristates, erucates, linolates, naphthenates, acetonylacetates, 8-hydroxyquinolinates and metalammine salt complexes.

28. The composition of claim 26 comprising a blend of a stable polymer selected from the group consisting of polyethylene, polypropylene, and polystyrene; 2–50% by weight of an unsaturated polymer or copolymer selected from the group consisting of styrene-butadiene copolymer, polybutadiene, and polyisoprene; and 0.001–2.0% of a transition metal selected from the group consisting of Ce, Cu, Co, Fe, Mn, and V, wherein the transition metal is the metal salt of the organic compound selected from the group consisting of stearates, palmitates, octoates, oleates, myristates, and naphthenates.

29. A degradable article prepared from a composition comprising a blend of a stable polymer selected from the group consisting of polyethylene, polypropylene, polystyrene, and their copolymers with other monomers; an antioxidant; 2–50% by weight of an unsaturated polymer or copolymer selected from the group consisting of styrene-butadiene copolymer, polybutadiene, polyisoprene, and a natural rubber; and 0.001–2.0% of a transition metal selected from the group consisting of Ce, Zn, Cu, Ni, Co, Fe, Mn, Cr and V, wherein the transition metal is the metal salt of the organic compound selected from the group consisting of stearates, palmitates, octoates, oleates, behenates, myristates, erucates, linolates, naphthenates, acetonylacetates, 8-hydroxyquinolinates and metalammine salt complexes.

30. The article of claim 29 which is a thin film or a sheet adapted for the manufacture of bags or wrappings, blow-molded and injection blow-molded articles, extruded foams, injection-molded articles, extruded parts and tubes, coextruded films, sheets and laminates, paper coatings, and filaments.

31. The polymer composition of claim I which incorporates a biologically active filler, and the unsaturated polymer does not include butadiene-styrene copolymer and is selected from the group consisting of (a) natural rubber, (b) synthetic rubber, (c) polymer of styrene, butadiene, or isoprene, (d) copolymer of butadiene and acrylic acid, acrylonitrile or isoprene, copolymer of isoprene and isobutylene, (e) terpolymer of ethylene, propylene and 1-6-hexadiene or norbornene, and (f) a terpolymer of styrene, butadiene and isoprene.

32. The composition of claim 31 wherein the filler is selected from the group natural starch, derivatives of natural starch, cellulose, derivatives of cellulose, a natural protein, and a powdered sugar of melting point higher than the host polymer composition.

33. The composition of claim 32 wherein the filler is starch.

34. A composition as claimed in claim 31 where the stable chemically saturated polymer is a copolymer of ethylene.

35. A composition as claimed in claim 34 where the stable chemically saturated polymer is a copolymer of ethylene and vinyl acetate, or acrylic acid, or propylene.

36. A composition as claimed in claim 34 where the stable chemically saturated polymer is a copolymer of ethylene and vinyl acetate which has been partially or totally hydrolyzed to leave hydroxy functional groups.

37. A composition as claimed in claim 31 where the stable chemically saturated polymer is a copolymer of propylene.

38. A composition as claimed in claim 37 where the stable chemically saturated polymer is a copolymer of propylene and ethylene, or acrylic acid.

39. A composition as claimed in claim 31 where the stable chemically saturated polymer is a copolymer of styrene.

40. A composition as claimed in claim 39 where the stable chemically saturated polymer is a copolymer of styrene and isoprene or acrylic acid.

41. A composition as claimed in claim 31 where the unstable chemically unsaturated polymer is a synthetic elastomer of the type made by the polymerization of a I:4 diene.

42. A composition as claimed in claim 41 where the chemically unsaturated polymer produced by the polymerization of butadiene.

43. A composition as claimed in claim 41 where the chemically unsaturated polymer produced by the polymerization of isoprene.

44. A composition as claimed in claim 31 where the unstable chemically unsaturated polymer is a copolymer of butadiene and isoprene.

45. A composition as claimed in claim 31 where the unstable chemically unsaturated polymer is a copolymer of butadiene and acrylic acid or a copolymer of butadiene and acrylonitrile.

46. A composition as claimed in claim 31 where the unstable chemically unsaturated polymer is a copolymer of isobutylene and isoprene.

47. A composition as claimed in claim 31 where the unstable chemically unsaturated polymer is a terpolymer of ethylene, propylene, and one of the following 1,6-hexadiene, norbornene.

48. A composition as claimed in claim 31 where the unstable chemically unsaturated polymer is a terpolymer of styrene, butadiene and isoprene.

49. A composition as claimed in claim 31 where the unstable chemically unsaturated is natural rubber.

50. The composition of claim 49 wherein the natural rubber is Hevea rubber or gutta percha.

51. A composition as claimed in claim 31 where the antioxidant is of the sacrificial type being an organic compound more readily oxidized then the host polymer blend.

52. A composition as claimed in claim 51 where the antioxidant is taken from the group Butylated Hydroxytoluene, Butylated Hydroxyanisole, Tertiary-Butylhydroquinone, Irganox 1010, Irganox 1076, etc.

53. A composition as claimed in claim 31 where the pro-oxidant is a transition metal salt.

54. The composition of claim 53 wherein the transition metal salt is selected from the group consisting of Ce, Zn, Cu, Ag, Ni, Co, Fe, Mn, Cr, V; and the organic salt is selected from the group consisting of stearates, palmitates, octoates, oleates, behenates, myristates, erucates, linolates, naphthenates, acetonylacetates, 8-hydroxyquinolinates and metalammine salt complexes.

55. The composition of claim 54 wherein the preferred transition metal salt is Mn, Co, and Fe and the preferred organic salt is selected from the group stearates, oleates, palmitates, naphthenates and octoates.

56. A composition as claimed in claim 31 in which the stable polymer is selected from the group consisting of polyethylene, polymethylmethacrylate, polypropylene, polystyrene, polyurethane, and their copolymers with other monomers; the unsaturated polymer or copolymer is selected from a group consisting of polybutadiene, polyisoprene, and a natural rubber; the biologically active filler is selected from natural or modified starch, natural and modified cellulose, and a natural protein; and the pro-oxidant is a transition metal salt or complex.

57. A composition as claimed in claim 31 in which the stable polymer is selected from the group consisting of polyethylene, polypropylene, polystyrene, and their copolymers with other monomers; the unsaturated polymer or copolymer is selected from a group consisting of polybutadiene, polyisoprene, and a natural rubber; the biologically active filler is selected from natural or modified starch; and the pro-oxidant is a transition metal salt or complex wherein the transition metal is selected from the group consisting of Ce, Zn, Cu, Ni, Co, Fe, Mn, Cr and V, and its salt displays an adequate level of solubility in polymer melts.

58. The composition of claim 57 comprising a blend of a stable polymer selected from the group consisting of polyethylene, polypropylene, and polystyrene; an antioxidant; 2-50% by weight of an unsaturated polymer or copolymer selected from the group consisting of polybutadiene, and polyisoprene; 2-60% by weight of a biologically active filler selected from natural and modified starch; and 0.001-2.0% of a transition metal selected from the group consisting of Ce, Cu, Co, Fe, and Mn, wherein the transition metal is the metal salt of the organic compound selected from the group consisting of stearates, palmitates, octoates, oleates, myristates, and naphthenates.

59. The article of claim 29 including a biologically active filler selected from natural and modified starch.

60. The article of claim 59 which is a thin film or a sheet adapted for the manufacture of blow-molded and injection blow-molded articles, extruded foams, injection-molded articles, extruded parts and tubes, coextruded films, sheets and laminates, paper coatings, and filaments.

61. A polymer composition for preparing degradable articles having as essential ingredients a blend of:
a stable chemically saturated polymer which contains an anti-oxidant active over a limited time, said saturated polymer selected from the group consisting of
(a) polyethylene, (b) polypropylene, (c) styrene, (d) copolymers of ethylene and a compound selected from the group consisting of vinyl acetate, acrylic acid, propylene and mixtures thereof, (e) copolymers of propylene and a compound selected from the group consisting of ethylene, acrylic acid and mixtures thereof, (f) copolymers of styrene and a compound selected from the group consisting of butadiene, isoprene, acrylic acid and mixtures thereof, and (g) mixtures thereof;
a less stable chemically unsaturated polymer selected from the group consisting of
(a) natural rubber, (b) a copolymer of styrene, (c) a terpolymer of ethylene, propylene and a compound selected from the group consisting of 1,6-hexadiene, norbornene and mixtures thereof, (d) a terpolymer of styrene, butadiene and isoprene; and
at least one transition metal organic salt wherein the transition metal is selected from the group consisting of Ce, Zn, Cu, Ni, Co, Fe, Mn, Cr and V and the organic salt is selected from the group consisting of: stearates, palmitates, octoates, oleates, behenates, myristates, erucates, linolates, naphthenates, acetonylacetates, hydroxyquinolinates and metalammine salt complexes.

62. The polymer composition of claim 61 wherein the unsaturated polymer is selected from the group consisting of natural rubber, styrene-butadiene, EPDM rubber, polybutadiene, polyisoprene.

63. The polymer composition of claim 61 wherein the saturated polymer is selected from the group consisting of polyethylene, polystyrene and polypropylene.

64. The polymer composition of claim 61 wherein the transition metal is selected from the group consisting of Mn, Cu, Fe and Co and the organic base is selected from stearate and oleate.

65. The polymer composition of claim 62 wherein the saturated polymer is selected from the group consisting of polyethylene, polystyrene and polypropylene.

66. The polymer composition of claim 65 wherein the transition metal is selected from the group consisting of Mn, Cu, Fe and Co and the organic base is selected from stearate and oleate.

67. The polymer composition of claim 61 wherein the composition contains a filler selected from the group consisting of a natural protein, a natural cellulose product and a powdered sugar of a melting point higher than the processing temperature of the host polymer composition.

* * * * *